INVENTOR:
Mac C. Chapman
By William W. Rundle
AGENT

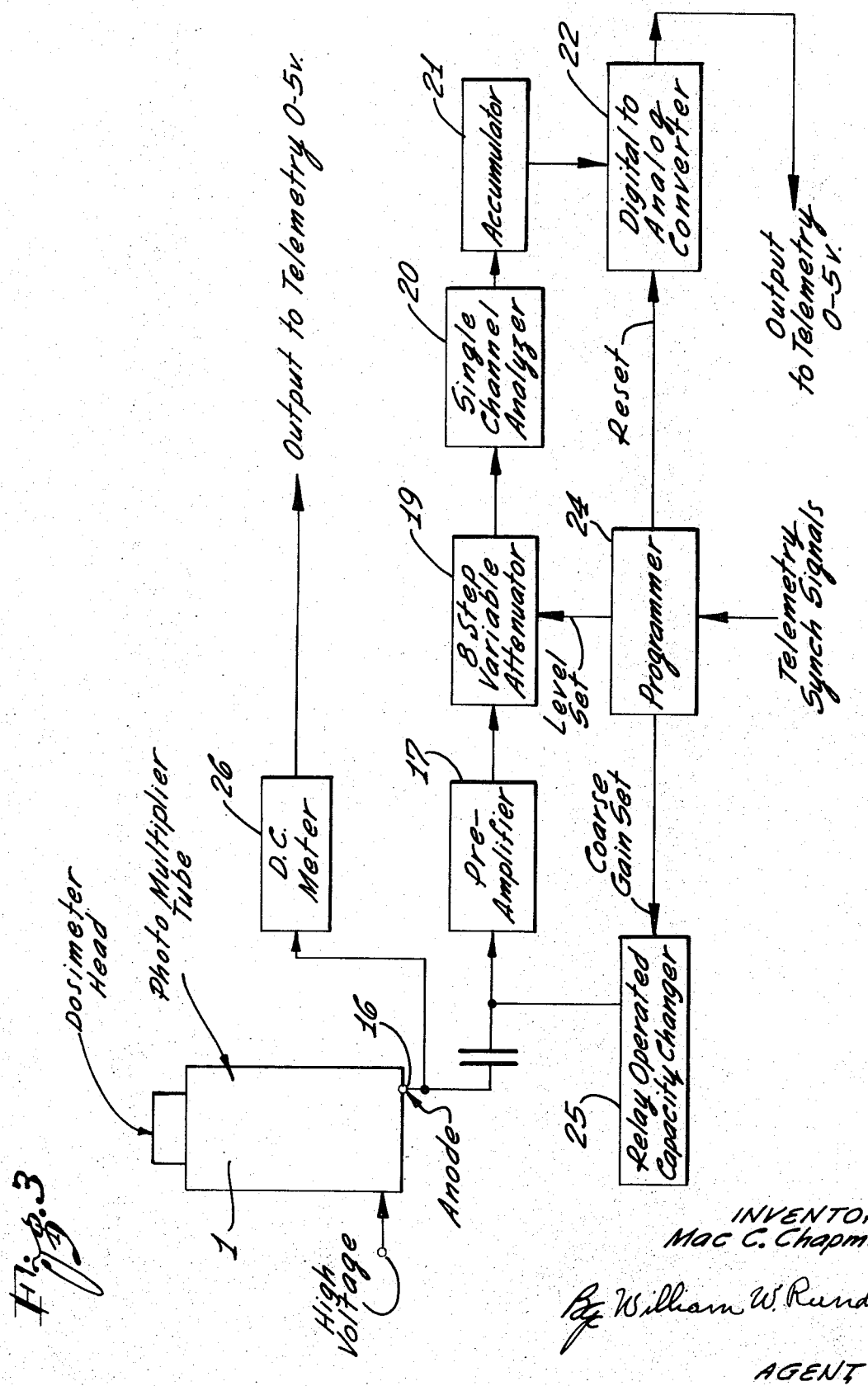

3,536,914
RADIATION DOSIMETER HAVING CELL SIZE SCINTILLATORS

Mac C. Chapman, Palos Verdes Peninsula, Calif., assignor to Northrop Corporation, Beverly Hills, Calif., a corporation of California
Filed Nov. 20, 1967, Ser. No. 684,374
Int. Cl. G01t 1/20
U.S. Cl. 250—71.5          6 Claims

ABSTRACT OF THE DISCLOSURE

The present dosimeter employs a sensor head having many cell-sized tissue-equivalent plastic spheres loosely spaced and cemented to a light pipe connected to a photomultiplier tube window. A cap of a known thickness of tissue-equivalent plastic may surround the head for obtaining different depth doses in tissue. Amplifiers and pulse height analyzers are connected to the output of the photomultiplier tube.

---

The present invention relates to radiation dosimeters, and more particularly, to a scintillator type instrument for measuring the absorbed dose and linear energy transfer (LET) spectrum in a cell-sized volume.

The measurement and assessment of radiobiological hazards involved in space and other applications are complex. The importance of absorbed dose and LET measurements for such applications have been well established. However, the tissue-equivalent ionization chambers and "Rossi-type" LET detectors that have been employed to date are so large as to significantly perturb the particle flux. Assessment of measurements at a specific point in the tissue is thus complicated and the results are unsatisfactory.

Therefore, it is an object of the present invention to provide a radiation dosimeter by which dosimetric parameters such as the spectrum of radiation energy deposition (in kiloelectron volts per micron) and total absorbed dose can be measured for small regions of tissue samples. Further objects are to provide such a dosimeter which will yield measurements of absorbed dose distribution, total absorbed dose, depth-dose distribution, and cell hit frequency data not possible with present dosimeters.

Other objects and advantages of my invention will be noted in the detailed description of specific apparatus to follow.

Briefly, my invention comprises the use of small, cell-size plastic scintillators as radiation detectors. A plurality of such scintillators is arranged in a sensing head at the input of a photoelectric device such as a photomultiplier tube. Absorbed dose distribution measurements are obtained from electronics connected to the output of the photomultiplier tube.

The present invention will be more fully understood by reference to the detailed description to follow, and to the accompanying illustrative drawings, wherein:

FIG. 3 is a block diagram of the dosimeter sensing head in connection with electronic circuitry which may be used therewith.

Figure 1:
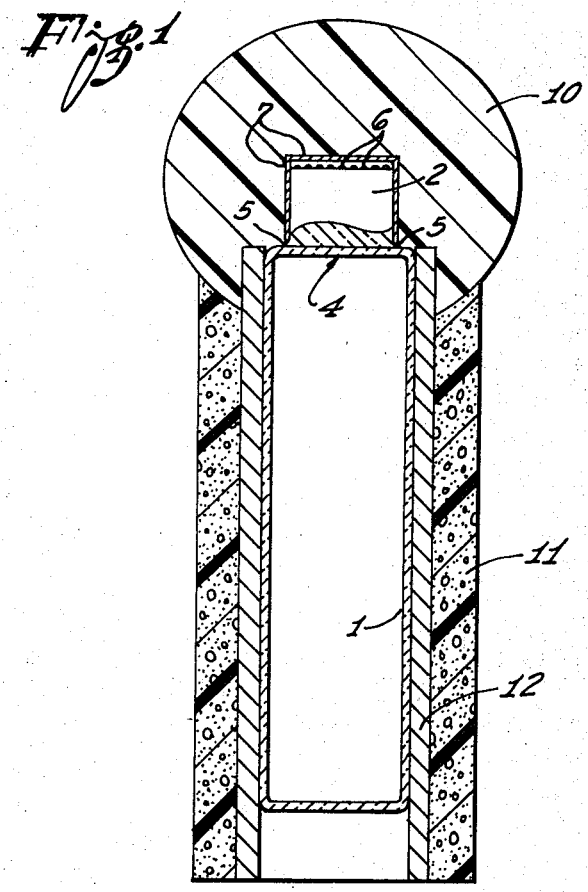
FIG. 1 is a diagrammatic side view, partly in sectional form, of a typical dosimeter incorporating the present invention.
Figure 2:
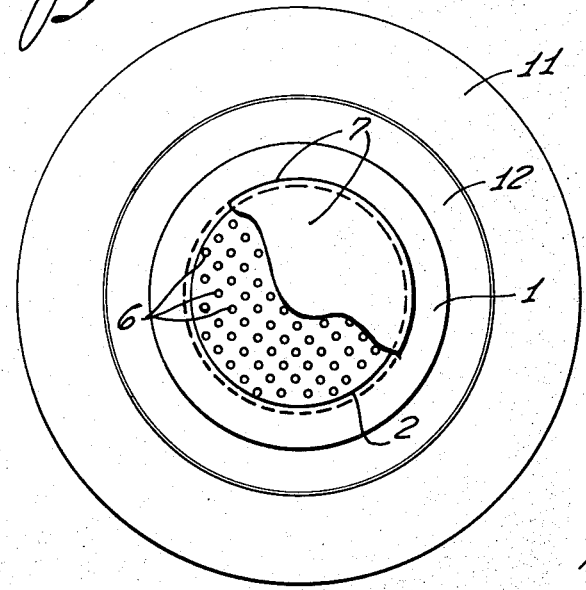
FIG. 2 is an enlarged top view of the dosimeter, with the cap 10 is removed.

Referring first to FIGS. 1 and 2 for a detailed description of the present invention, a photomultiplier tube 1 has a cylindrical light pipe 2, of Lucite for example, cemented to the window 4 (preferably quartz) of the photomultipler tube 1. The bonding cement 5 used may be Solithane 113, a polyurethane material. As further shown in FIG. 2, the upper end of light pipe 2 carries a multiplicity of organic plastic scintillator spheres 6, which are of a uniform diameter the size of a cell, and are uniformly spaced. The spheres 6 are attached to the light pipe 2 with a small amount of the same type of bonding cement 5.

An opaque, minimum thickness reflector 7, such as aluminum foil or a vacuum deposited aluminum coating, may be used around the sides and top of the light pipe 2 for effective light collection.

The light pipe 2 serves to couple the scintillators 6 to the photomultiplier tube 1, and also provides a tissue-like backstop between the scintillators and the face of the photomultiplier tube, thus reducing the probability of backscatter radiation from a non-tissue-like material. Therefore, scintillators 6 will experience an unperturbed dose field, closely approximating the ideal case of a tissue sample. By virtue of the light pipe 2, the sensor head protrudes sufficiently to provide a solid view angle in excess of $2\pi$ steradians.

Around the dosimeter head itself, a shielding cap 10 may be provided. Such a cap 10 is composed of a known thickness of tissue-equivalent plastic, and is for the purpose of increasing the tissue depth covering the detector. Cap 10 may be removable, so that various thickness caps can be used to yield depth-dose data. Or, several dosimeters with different size caps can be used simultaneously.

The sides of the photomultiplier tube 1 are covered by a potting of silicone rubber 12, for example, which is surrounded by a packing 11 of tissue-equivalent plastic or low-density foam. Packing 11 serves to provide a tissue-equivalent shielding against radiation which might enter through the tube walls and would otherwise irradiate the scintillators 6 from an unshielded direction.

The size of scintillators 6 is shown greatly exaggerated for the sake of convenience and clarity. The actual size of the plastic scintillators 6 is preferred to be in the range of 10 to 100 microns diameter, or largest linear dimension if shapes other than spheres are used. The invention is not limited to spheres only, since other shapes such as cylinders or sheets, for example, can be used. As to scintillator size, the general requirement according to the concept of the present invention is that the scintillators 6 be the size of tissue cells or smaller. The largest cells are in the neighborhood of 100 microns. However, the invention is not deemed to be limited to this exact range of 10–100 microns, since any size under approximately 150 microns could be advantageous.

The scintillator spheres 6 should have their emission wavelength matched to the spectral response of the photomultiplier tube 1. For example, the scintillator material known as NE102, obtainable from Nuclear Enterprises Ltd. of Canada, has a 4250 A. maximum emission corresponding satisfactorily with the spectral response of certain tube types. This NE102 product is a loaded polyvinyltoluene, one of the varieties of organic scintillators.

To obtain reasonable count rates, a large number of scintillators 6 should be used; however, to minimize the probability of a radiation particle hitting more than one scintillator, they should be loosely spaced on the light pipe 2.

The present dosimeter is especially intended as a space-qualified instrument, to telemeter space radiation measurements to earth. The previously described apparatus can function in connection with the conventional type of electronic circuitry as indicated in FIG. 3, or similar cicuitry. The preset invention resides in the dosimeter head, and the electronics while requiring suitable design are shown merely for the purpose of illustration.

In FIG. 3, output from the anode 16 of the photomultiplier tube 1 is AC coupled into a delay line clipping preamplifier 17. This is followed by a variable attenuator 19 which precedes a single-channel pulse analyzer 20. Pulses from analyzer 20 which are between the upper and lower energy discrimination levels trip a pulse into an accumulator 21 for storage. A digital to analog converter 22 provides a suitable output for telemetry.

Operation of the system is controlled by a programmer 24. When programmer 24 receives a telemetry synch signal, it resets the converter 22, and changes the attenuator 19 to the next of its eight steps. When all eight steps have been used, programmer 24 operates to close a reed relay 25, adding capacity to the anode 16 and reducing the system gain by a factor of 30. The pulse height which previously corresponded to the top of channel eight now corresponds to the bottom of channel one. Attenuator 19 is again stepped through eight levels, and a sixteen-channel analysis is completed. A total pulse height range of 900 to one is obtained by this technique. If the required range is less than 30 to one, the coarse gain change by means of relay 25 can be omitted.

A DC meter 26 is DC coupled to anode 16 to provide a direct measure of the total absorbed dose.

It is thus seen that the present invention provides a means of measuring the distribution of energy losses resulting from charged particles passing through tissue-equivalent samples which are of the same order of size as actual cells. The absorbed dose is obtained by integrating the absorbed dose distribution, and depth-dose distribution data is obtained by changing the amount of tissue-equivalent material surrounding the detector. Cell-hit frequency is obtained by relating the total count rate to the number of scintillators 6, which is one of the advantages of using cell-size scintillators.

While in order to comply with the statute, the invention has been described in language more or less specific as to structural features, it is to be understood that the invention is not limited to the specific features shown, but that the method and means herein disclosed comprise preferred forms of putting the invention into effect, and the invention is therefore claimed in any of its forms of modifications within the legitimate and valid scope of the appended claims.

What is claimed is:

1. A radiation dosimeter comprising a light pipe; a photomultiplier tube; one end of said light pipe cemented to the window of said tube; a multiplicity of cell-size plastic scintillators up to a maximum of 150 microns in diameter fixed to said light pipe; and electronic circuitry including a pulse height analyzer connected to the output of said photomultiplier tube.

2. Apparatus in accordance with claim 1 wherein said scintillators are solid plastic spheres of substantially uniform size.

3. Apparatus in accordance with claim 1 wherein said scintillators have a size of from 10 to 100 microns, and a spacing of at least three diameters.

4. Apparatus in accordance with claim 1 including a removable shield cap of tissue-equivalent plastic surrounding said scintillators and said light pipe, said cap having a known uniform thickness.

5. Apparatus in accordance with claim 1 wherein the walls of said tube are covered by a predetermined thickness of opaque tissue-equivalent shield material.

6. Apparatus in accordance with claim 1 wherein said scintillators are spaced from the end of said tube sufficiently to be effectively exposed to radiation throughout a solid view angle of at least $2\pi$ steradians.

References Cited

UNITED STATES PATENTS

| | | | |
|---|---|---|---|
| 2,853,620 | 9/1958 | Fox et al. | 250—71.5 |
| 3,032,657 | 5/1962 | Meier et al. | 250—71.5 |
| 3,127,512 | 4/1964 | Monaghan | 250—71.5 |
| 3,149,230 | 9/1964 | Hall | 250—71.5 |
| 3,226,545 | 12/1965 | Potsaid. | |

RALPH G. NILSON, Primary Examiner

M. J. FROME, Assistant Examiner

U.S. Cl. X.R.

250—71, 83